(12) United States Patent
Andersen et al.

(10) Patent No.: US 12,467,117 B2
(45) Date of Patent: Nov. 11, 2025

(54) METHOD OF RECOVERING IRIDIUM

(71) Applicant: Syddansk Universitet, Odense M (DK)

(72) Inventors: Shuang Ma Andersen, Odense S (DK); Raghunandan Sharma, Odense M (DK)

(73) Assignee: Syddansk Universitet, Odense (DK)

( * ) Notice: Subject to any disclaimer, the term of this patent is extended or adjusted under 35 U.S.C. 154(b) by 793 days.

(21) Appl. No.: 17/755,113

(22) PCT Filed: Oct. 21, 2020

(86) PCT No.: PCT/EP2020/079596
§ 371 (c)(1),
(2) Date: Apr. 21, 2022

(87) PCT Pub. No.: WO2021/083758
PCT Pub. Date: May 6, 2021

(65) Prior Publication Data
US 2023/0023272 A1     Jan. 26, 2023

(30) Foreign Application Priority Data
Oct. 28, 2019   (EP) .................................. 19205560

(51) Int. Cl.
*C22B 11/00*   (2006.01)
*C22B 3/44*    (2006.01)

(52) U.S. Cl.
CPC .............. *C22B 11/048* (2013.01); *C22B 3/44* (2013.01)

(58) Field of Classification Search
CPC .................................. C22B 11/048; C22B 3/44
See application file for complete search history.

(56) References Cited

U.S. PATENT DOCUMENTS

| | | |
|---|---|---|
| 4,130,625 A | 12/1978 | Evers et al. |
| 4,341,741 A | 7/1982 | Davidson et al. |
| 5,997,719 A | 12/1999 | Shor |
| 6,183,545 B1 | 2/2001 | Okuhama et al. |
| 2003/0008145 A1 | 1/2003 | Goldstein |
| 2004/0118249 A1 | 6/2004 | Asano et al. |

FOREIGN PATENT DOCUMENTS

| | | | | |
|---|---|---|---|---|
| EP | 1157740 A2 | 11/2001 | | |
| JP | 63-270420 A | 11/1988 | | |
| JP | S63270420 A | * 11/1988 | .............. | Y02P 10/20 |
| WO | WO-2005035804 A1 | * 4/2005 | ........... | C22B 11/048 |

OTHER PUBLICATIONS

Sibrell, P. L., Gary B. Atkinson, and Larry A. Walters. "Cyanide leaching chemistry of platinum-group metals." (1994). (Year: 1994).*

(Continued)

*Primary Examiner* — Anthony J Zimmer
*Assistant Examiner* — Annette Phan
(74) *Attorney, Agent, or Firm* — KNOBBE, MARTENS, OLSON & BEAR, LLP

(57) ABSTRACT

The present invention relates to a method of recovering iridium in the form of iridium solutions, metal, oxides or salts from a body, such as a spent catalyst, comprising iridium oxides.

10 Claims, 7 Drawing Sheets

(56) References Cited

OTHER PUBLICATIONS

"Sono-synthesis approach in uniform loading of ultrafine ag nanoparticles on reduced graphene oxide nanosheets: An efficient catalyst for the reduction of 4-Nitrophenol." Ultrasonics Sonochemistry, vol. 44, Jan. 31, 2018, pp. 1-13, https://doi.org/10.1016/j.ultsonch.2018.01.020.. (Year: 2018).*
Yakoumis, Iakovos, et al. âRecovery of Platinum Group Metals from spent automotive catalysts: A Review (Year: 2021).*
International Search Report for PCT/EP2020/079596 dated Nov. 10, 2020.

* cited by examiner

METHOD OF RECOVERING IRIDIUM

CROSS REFERENCE TO RELATED APPLICATIONS

This application is a U.S. National Phase Application of PCT International Application Number PCT/EP2020/079596, filed on Oct. 21, 2020, designating the United States of America and published in the English language, which is an International Application of and claims the benefit of priority to European Patent Application No. 19205560.6, filed on Oct. 28, 2019. The disclosures of the above-referenced applications are hereby expressly incorporated by reference in their entireties.

FIELD OF THE INVENTION

The present invention relates to a method of recovering iridium in the form of iridium solutions, metal, oxides or salts from a body, such as a spent catalyst, comprising iridium oxides.

BACKGROUND OF THE INVENTION

Recovery of precious metals from spent catalysts is of significant importance for several industries, such as the automotive, fuel cells and electrolysis sector. In particular, the recovery of iridium, being this element one of the rarest elements on the earth, is essential in the development of many emerging technologies.

Iridium in the form of iridium oxide nanoparticles is the state-of-the-art and an irreplaceable catalyst for water electrolysis, fuel cells, polymer synthesis and other processes due to its superior oxidation resistance and catalysis activity. Iridium has an annual production<4 tons, ~60 times less than platinum, and its price tripled in the last three years, which makes recycling of this element very attractive.

Recycling of Ir from spent catalysts is thus essential for the sustainable growth of several relevant industries.

However, currently recovery of iridium occurs through the use of very harsh and extreme conditions, e.g. pyrometallurgy and/or via long exposure to acidic baths, such as Aqua regia, at high temperature.

Current methods are thus rather time and energy consuming as well as not very environmentally friendly.

For example, leaching of spent $Ir_xO_y$ catalyst in acidic baths is very slow due to its high corrosion resistance. Indeed compared to Pt based materials, $Ir_xO_y$ shows a high stability and resistance towards dissolution.

Hence, there is the need of an environmentally friendly method for recovering Ir from spent catalyst.

Furthermore, there is the need for a method of recovering Ir from spent catalyst, which is less time, and energy consuming as well as that requires less aggressive conditions.

Hence, an improved method for recovering iridium from spent catalysts would be advantageous, and in particular a more efficient, reliable and environmentally friendly method for recovering iridium from spent catalyst would be advantageous.

OBJECT OF THE INVENTION

An object of the present invention is to provide a more efficient, less time and energy consuming and more environmentally friendly method of recovering Ir.

An object of the present invention may thus be seen as the provision of an alternative to the methods of the prior art.

It is also an object of the present invention to wholly or partly overcome the above disadvantages and drawbacks of the prior art.

In particular, it may be seen as a further object of the present invention to provide a method of recovering iridium, which solves the above mentioned problems of the prior art with the use of a reduction step prior to the exposure to an acidic environment.

SUMMARY OF THE INVENTION

Thus, the above described object and several other objects are intended to be obtained in a first aspect of the invention by providing a method of recovering iridium from a body comprising $Ir_xO_y$, wherein x is a number between 1 and 2 and y is a number between 1 and 4, wherein the method comprises: treating the body with a reducing agent or with means providing a reducing agent, thereby forming a suspension; dissolving the suspension by exposing the suspension to an acidic solution, thereby forming a solution comprising iridium ions.

The invention originates from the observations that optimal dissolution of Ir oxides based catalyst was achieved when a first reduction step, performed by a strong reducing agent was performed prior the dissolving step in acidic environment.

The inventors observed that when the reduction step was performed, even very mild acidic conditions for limited period of time were sufficient to achieve full dissolution of the Ir oxide compounds into an acidic aqueous solution.

The invention is particularly, but not exclusively, advantageous for recovering Ir in the form of Ir ions solution that can then be processed so as to produce the desired Ir compounds in the desired form.

The first step of the method of the invention is based on a reduction step, in which a suspension of iridium oxides is formed.

The treating, i.e. the exposure of the body to a reducing agent, produces a suspension of particles comprising Ir oxides having a lower oxidation state than the one of the body.

Upon treating the body with a reducing agent, a suspension is therefore formed. During the reduction step, the reducing agent does not dissolve the Ir oxides body but reacts with it and produces Ir oxide particles having an oxidation state that is lower than the one in the Ir oxides body.

A suspension is defined as a heterogeneous mixture that contains solid particles sufficiently large for sedimentation, which however are dispersed in a medium, such as an aqueous solution. Indeed the particles are visible to the naked eye, may be larger than one micrometer, and settle upon centrifugation.

Thus, a suspension is characterized as a heterogeneous mixture in which the solute particles do not dissolve, but are suspended throughout the bulk of the solvent, left floating around freely in the medium.

This is, like in the current process, generally induced by sonication.

In some further embodiments, the treating of the body with a reducing agent comprises treating the body with a reducing agent for a period of time between 5 and 30 minutes at room temperature or higher temperature and under sonication.

Room temperature is defined as a temperature between 20° C. and 25° C.

Sonication is defined as acting on the body comprising $Ir_xO_y$ by applying sound energy to agitate particles. Ultrasonic frequencies maybe in the range>20 kHz and the process may be referred to as ultra-sonication or ultrasonication.

In some embodiments, the $Ir_xO_y$ comprises Ir(IV) oxides compounds, and the suspension after the reduction step is a suspension of $Ir_xO_y$ compounds comprising Ir(III) oxides particles.

For example, the body comprising $Ir_xO_y$ may comprise $IrO_2$, while the suspension after the reduction step may comprise particles of $Ir_2O_3$, i.e. Ir superoxide.

In some embodiments, the reducing agent is or comprises hydrazine.

For example, the body comprising $Ir_xO_y$ may be exposed to, i.e. added to, a solution of Hydrazine, such as a 35% (wt %) hydrazine ($NH_2NH_2$) solution in water.

In some embodiments, the reducing agent may be an organic solution of hydrazine.

In some other embodiments, the hydrazine used may be a solid reagent, such as crystals of hydrazine monohydrate.

In some other embodiments, the hydrazine used may be product of reactions, such as oxidation of ammonia or urea using peroxide or chlorine-based oxidations.

In some other embodiments, the hydrazine used may be product of biological process (biosynthesis), such as bacteria or living organisms.

In some further embodiments, an aqueous solution of hydrazine having a mean weight percent concentration wt % higher than 35%, such as 50% or 75%, or lower than 35%, such as 25% or 10%, may be used.

The mean weight percent wt % or w/w is referred herein as weight of solute over the weight of solvent per 100 parts.

In some other embodiments, the reducing agent is or comprises formic acid.

For example, the body comprising $Ir_xO_y$ may be exposed to, i.e. added to, a solution of formic acid having a concentration between 0.5 and 3 M, such as a 1 M formic acid.

In some further embodiments, the reducing agent is or comprises sodium borohydride. The sodium borohydride may have a concentration between 0.5 and 3 M, such as a 1 M sodium borohydride.

In the second step, the suspension is then dissolved using very mild condition, such as exposure to an aqueous solution that has been acidified, e.g. at a pH<1, such as $-0.5 \leq pH \leq 1$.

Preferably, the dissolution occurs in electrolytes consisting of aqueous acidic solutions of a halide, such as chloride, salt.

In some other embodiments, the hydrogen halides, such as an aqueous solution of HCl, have a concentration between 0.5M to 1M.

In some further embodiments, the aqueous solution further comprises an halide salt, such as NaCl, having a concentration between 0.1M and 4M.

Dissolution in mild acidic condition of HCl 1M and NaCl 3M aqueous solution following the reduction step has shown an improvement on the dissolution rate by at least a factor 3.

In some embodiments, the dissolving comprises dissolving of the suspension by exposing the suspension to a solution comprising hydrogen halides for a period of time between 10 minutes to 4 hours at a temperature between 50° C. and 120° C. at ambient pressure of 1 Atmosphere (Atm), such as at a temperature of 103° C., i.e. the reflux temperature of the aqueous solution 1 M HCl, 3M NaCl.

Dissolution may occur under reflux, i.e. heating at the boiling temperature with the presence of a condenser to prevent reagents from escaping the reaction chamber.

Once the solution containing Ir ions has been produced, this may be used as such for coating purposes.

The solution containing Ir ions produced by dissolution may advantageously be used for the syntheses of compounds for various industrial applications without the need of isolating an intermediate iridium compound.

In some embodiments, Ir metal particles may be produced.

For example, the method according to first aspect of the invention, may further comprise: precipitating the iridium ions as Ir metal particles by exposing the solution containing iridium ions to a reducing agent, such as hydrazine at a temperature between 60° C. and 100° C. for a period of time between 1 hour and 3 hours.

In some other embodiments, $Ir_xO_y$ may be synthesized following the dissolution without formation of an intermediate compound.

For example, the method according to first aspect of the invention may further comprise: precipitating the iridium ions as $Ir_xO_y$, by treating the solution containing iridium ions with NaOH at a temperature between 100° C. and 200° C. for a period of time between 10 minutes and 60 minutes at a pressure between 1 and 10 Atm.

In some further embodiments, Ir salts may be formed following the dissolution step.

For example, the method according to first aspect of the invention, may further comprise: precipitating the iridium ions as Ir salts, such as $(NH_4)_2IrCl_6$ by treating the solution containing iridium ions with $H_2O_2$, and by adding $NH_4Cl$ in a concentration 3M eq. to the oxidized solution containing iridium ions.

The first and other aspects and embodiments of the present invention may each be combined with any of the other aspects. These and other aspects and embodiments of the invention will be apparent from and elucidated with reference to the embodiments described hereinafter.

BRIEF DESCRIPTION OF THE FIGURES

The method of recovering iridium according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
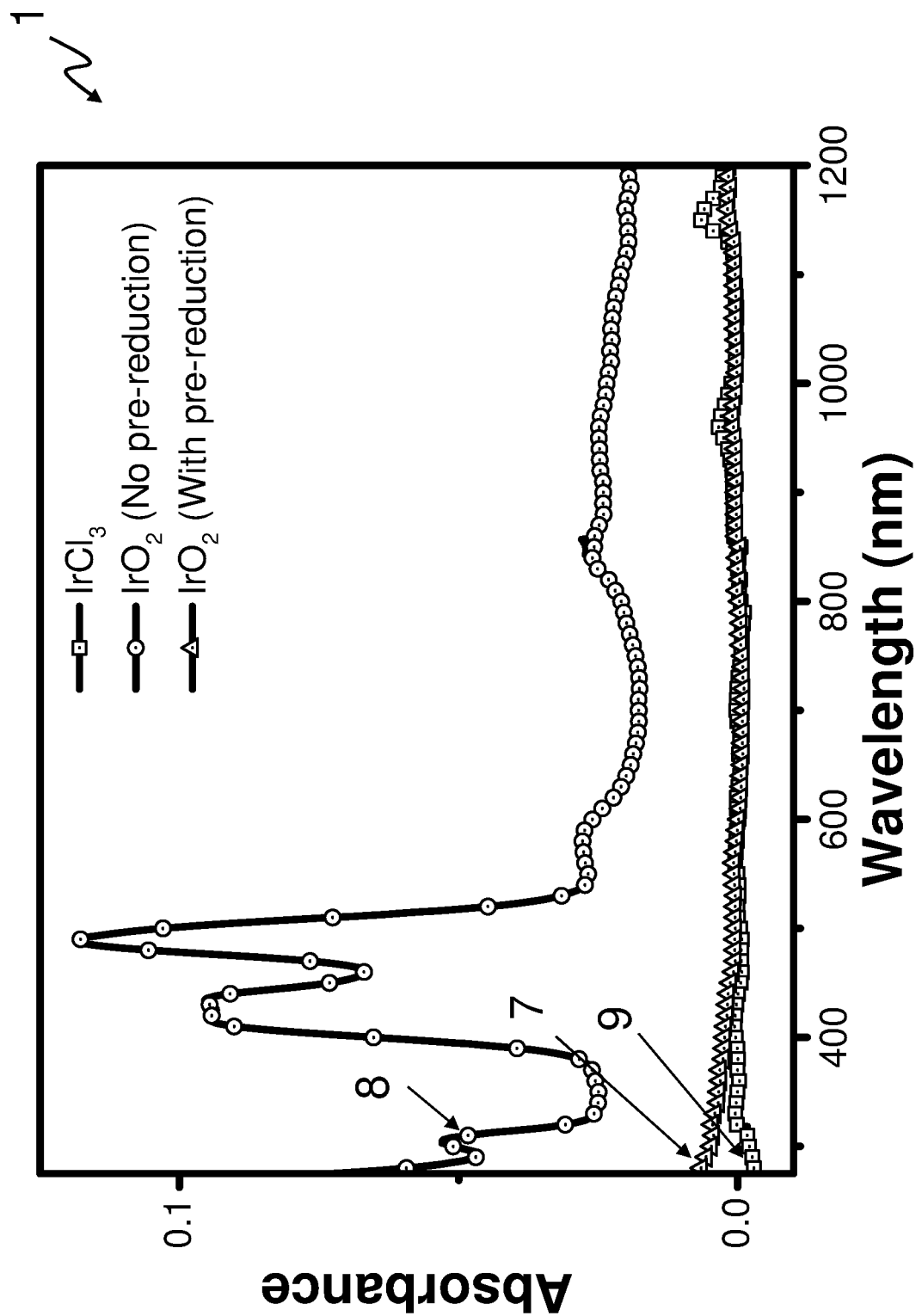
FIG. 1 shows the absorption spectra of the dissolution of $IrO_2$ when a first reduction step is performed compared to the one without reduction step.

FIG. 1 shows a comparison 1 between absorption spectra of the solution following the dissolution step, when a first reduction step is performed 7 compared to the absorption spectrum when the first reduction step is not performed 8.

An absorption spectrum 9 of $IrCl_3$ in aqueous solution is also shown as reference.

The comparison reveals that the $IrO_2$ dissolved after the reduction step shows no absorption peaks between 200 and 1200 nm, while the $IrO_2$ dissolved without reduction step shows a series of characteristic peaks between 400 and 550 nm.

This reveals formation of different chemical species when no reduction step is performed, suggesting possibly two different dissolution routes.

During the reduction step, higher oxidation state iridium, such as Ir(IV) oxide is transformed into lowever oxidation state iridium, such as Ir(III) oxide species as shown by the resemblance of the $IrCl_3$ spectrum with the one of the dissolution of $IrO_2$ when the reduction step was performed.

This is clearly not the case of the solution of $IrO_2$ when the reduction step is not performed.

Figure 2:
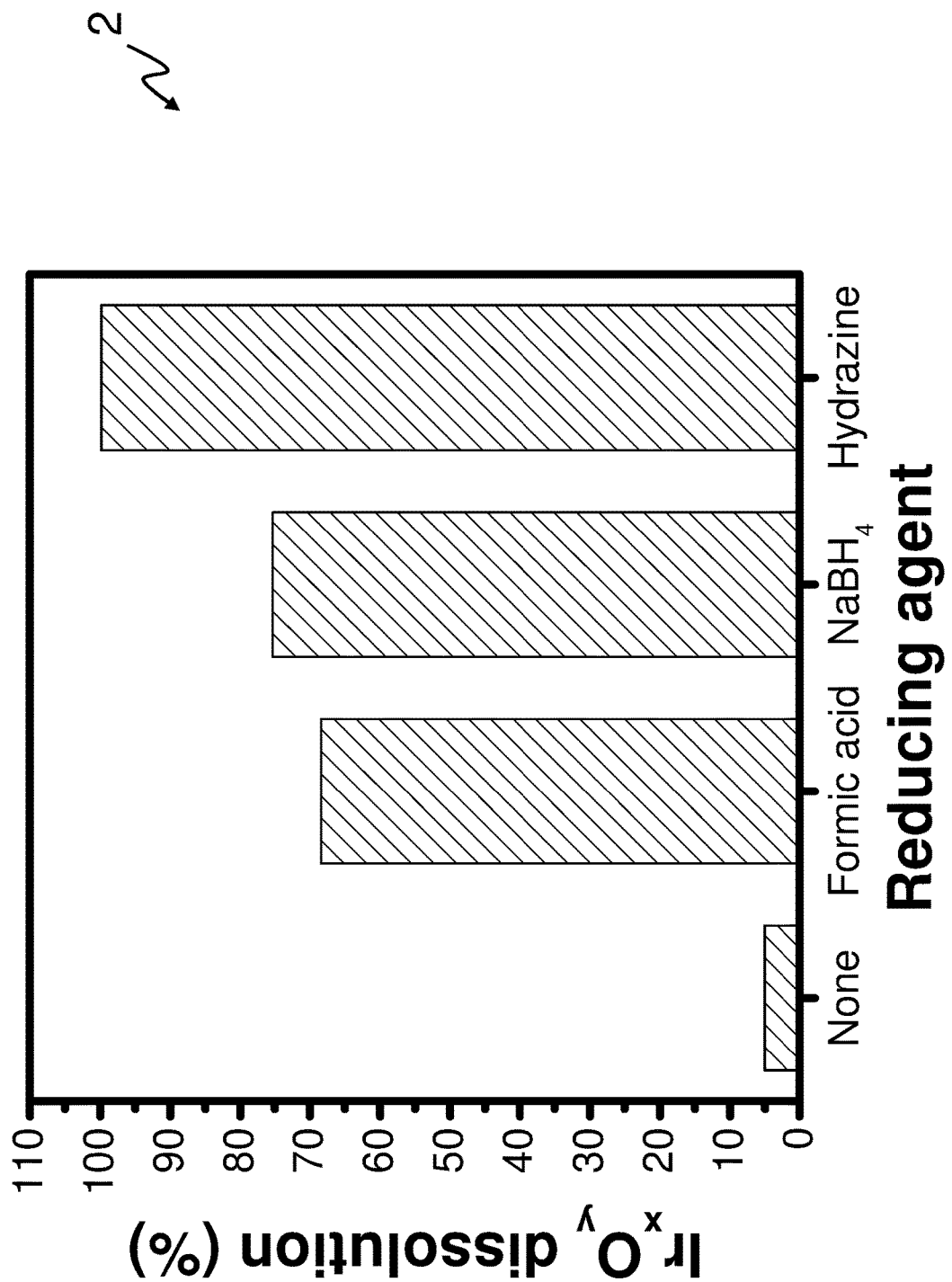
FIG. 2 is a bar chart comparing the dissolution of $Ir_xO_y$ compounds without and with using different reducing agents.

FIG. 2 is a bar chart 2 comparing the dissolution of $Ir_xO_y$ compounds without and with using different reducing agents.

From the chart it appears clear that using a pre-reduction step improves the final dissolution by several orders of magnitude; moreover performing a first reduction step using hydrazine produces a better dissolution of $Ir_xO_y$ compounds compared to the use of $NaBH_4$ or formic acid.

All processes were performed by subjecting the $Ir_xO_y$ samples to ultrasonication for 5 min in ultrapure water solution of the corresponding reducing agent, i.e. 35% hydrazine or 1 M formic acid or 1 M $NaBH_4$ in a reducing agent/Ir molar ratio of >1, such as 10 and a $Ir_xO_y$/water ratio of 20 mg $Ir_xO_y$/1 mL of water When using 1 M formic acid, a heating step of 100° C. for 5 minutes was introduced to facilitate reduction.

The dissolution step was then performed in 1M HCl, 3M NaCl heated under reflux for 60 minutes.

Figures 3, 4:
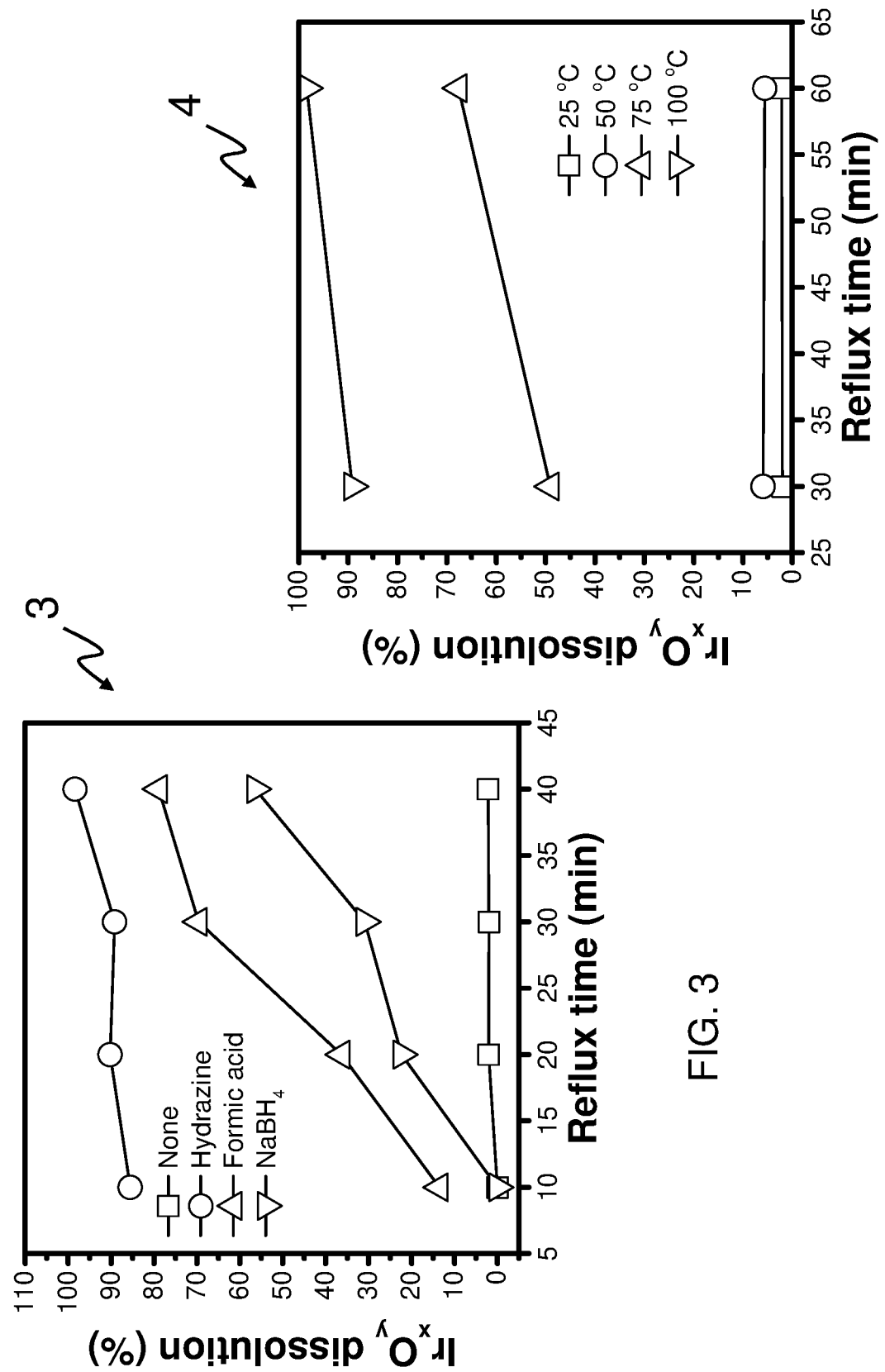
FIG. 3 shows a comparison between $Ir_xO_y$ dissolution without and with using different reducing agents vs reflux time.
FIG. 4 shows a comparison between $Ir_xO_y$ dissolution using different temperature vs reflux time.

FIG. 3 shows a comparison 3 between $Ir_xO_y$ dissolution without and with using different reducing agents vs reflux time.

The first reduction step was perform as in the earlier experiment with ultrasonication at room temperature for ~5 minutes.

For the case of formic acid, ultrasonication at room temperature for ~5 minutes was followed by holding the temperature of the suspension at 100° C. for 5 minutes.

The second dissolution step was performed in an aqueous solution of 1 M HCl and 3M NaCl in a $Ir_xO_y$/solution ratio of 3 mg $Ir_xO_y$/1 mL of the solution and the dissolution was measured at different reflux time.

It appears clear that hydrazine has the best performance as dissolution close to 90% was already achieved after only 10 minutes of reflux.

FIG. 4 shows a comparison between $Ir_xO_y$ dissolution using different temperature vs reflux time when hydrazine was employed in the first reduction step.

It appears clear that the higher the temperature employed, the better the dissolution of $Ir_xO_y$.

Figure 5:
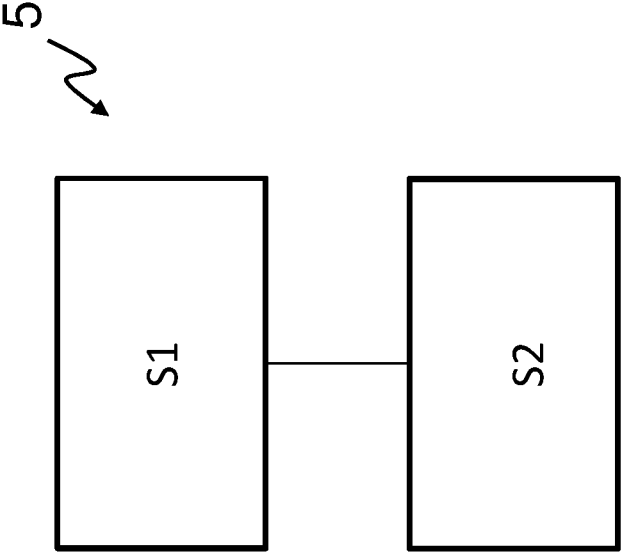

FIG. 5 is a flow-chart of the method 5 according to some embodiments of the invention.

The method 5 of recovering iridium from a body comprising $Ir_xO_y$, wherein x is a number between 1 and 2 and y is a number between 1 and 4 comprises:
S1, treating the body with a reducing agent, thereby forming a suspension;
S2, dissolving the suspension by exposing the suspension to an acidic solution, thereby forming a solution comprising iridium ions.

Figure 6:
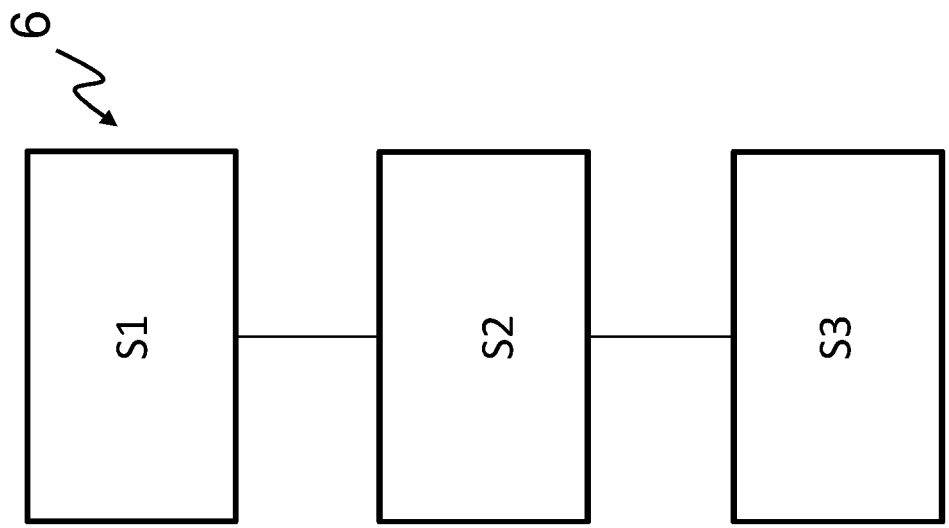
FIG. 5 and FIG. 6 are flow-charts of the methods according to some embodiments the invention.

FIG. 6 is another flow-chart of the method 6 according to some embodiments of the invention.

The method 6 of recovering iridium from a body comprising $Ir_xO_y$, wherein x is a number between 1 and 2 and y is a number between 1 and 4, comprises:
S1, treating the body with a reducing agent, thereby forming a suspension;
S2, dissolving the suspension by exposing the suspension to an acidic solution, thereby forming a solution comprising iridium ions;
S3, precipitating the iridium ions as Ir metal particles or $Ir_xO_y$ or Ir salt.

In some embodiments, the recovery of the dissolved Ir ions in the form of iridium metal ($Ir^0$) particles may be achieved by reducing the Ir ions through the use of a reducing agent.

The Ir ions in acidic aqueous solution obtained by dissolving iridium oxides through steps S1 and S2 may be reduced through the addition of NaOH at pH 13 and an aqueous solution of hydrazine having a concentration of 35 wt % in a Hydrazine/Ir ions molar ratio of >1, such as 10

The solution is then held at 80° C. for 2 hours producing precipitation of Ir metal particles that can be separated from the solution by centrifugation and purified by washing with ultrapure water.

Figure 7:
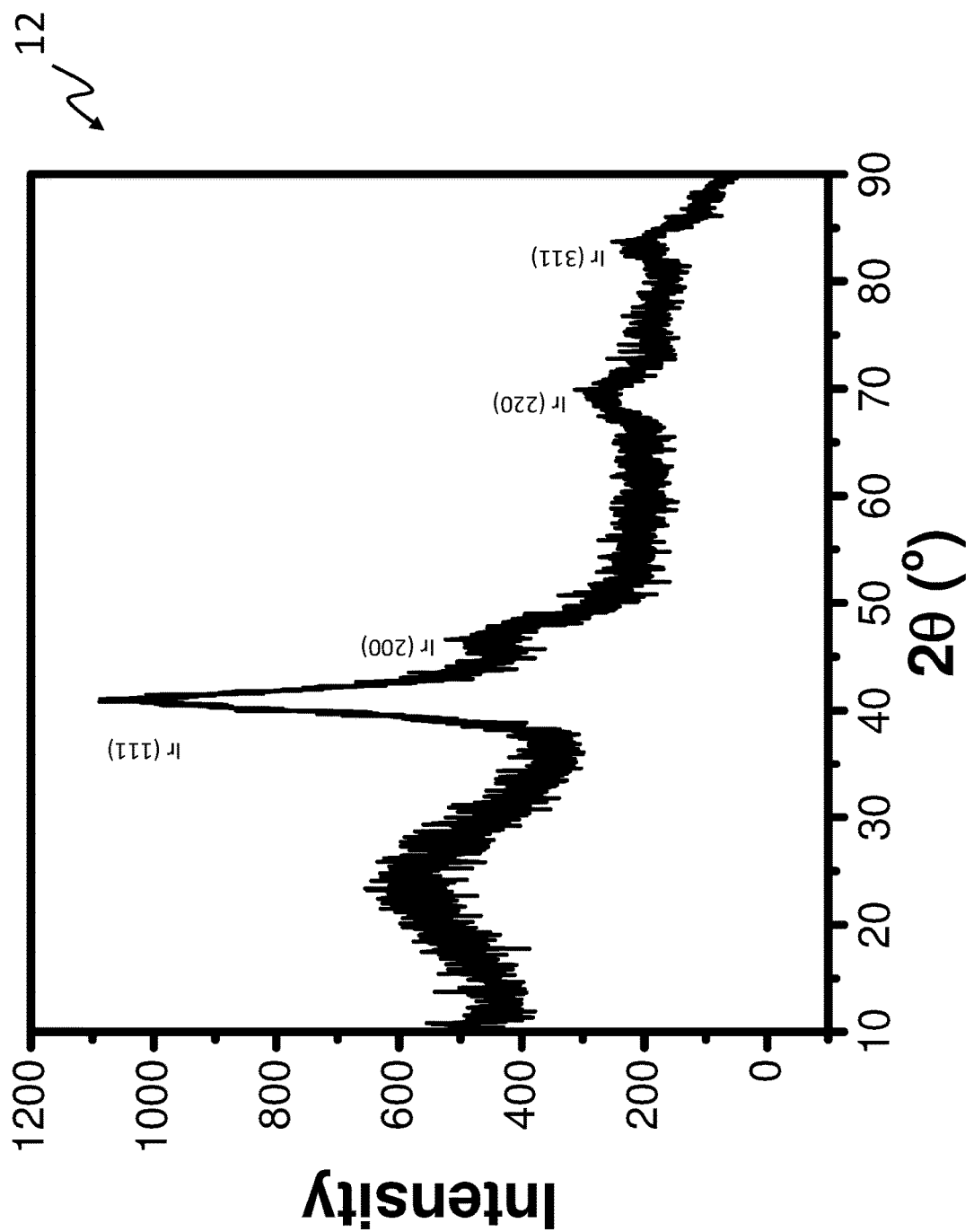
FIG. 7 shows the X-ray diffraction (XRD) pattern of Ir metal particles produced according to one embodiment of the invention.

FIG. 7 shows a XRD pattern 12 of the precipitate collected, which exhibits the diffraction peaks corresponding to iridium metal ($Ir^0$), confirming the formation of Ir metal ($Ir^0$).

In some other embodiments, the recovery of the dissolved Ir ions in the form of iridium oxides ($Ir_xO_y$) electrocatalyst may be achieved using a microwave synthesis route.

The Ir ions in acidic aqueous solution, obtained by dissolving iridium oxides through steps S1 and S2, may be reduced through the addition of NaOH at pH 13 and ethylene glycol (EG) in a EG/Ir ions molar ratio of 20.

The solution is then held at 150° C. for 15 minutes in a microwave oven. However, any other source of heating may be use, adjusting temperature and time of heating accordingly.

This produces precipitation of Ir oxides ($Ir_xO_y$) that can be separated from the solution by centrifugation and purified by washing with ultrapure water.

The $Ir_xO_y$ produced through this method, shows catalytic activity in oxygen evolution reactions comparable to the Ir oxides commercially used in water electrolyzers.

In some further embodiments, the recovery of the dissolved Ir ions, in the form of iridium salts such as ammonium hexachloroiridate $(NH_4)_2IrCl_6$, may be achieved through the use of an oxidation agent.

The Ir ions in acidic aqueous solution obtained by dissolving iridium oxides through steps S1 and S2 may be oxidized through the addition of $H_2O_2$ in a $H_2O_2$/Ir ions molar ratio of >1, such as 2.5 under refluxing for 20 minutes.

Addition of NH$_4$Cl powder to a concentration>2M, such as 3M produces the precipitation of (NH$_4$)$_2$IrCl$_6$ that can be separated from the solution and purified by washing with methanol.

Figure 8:
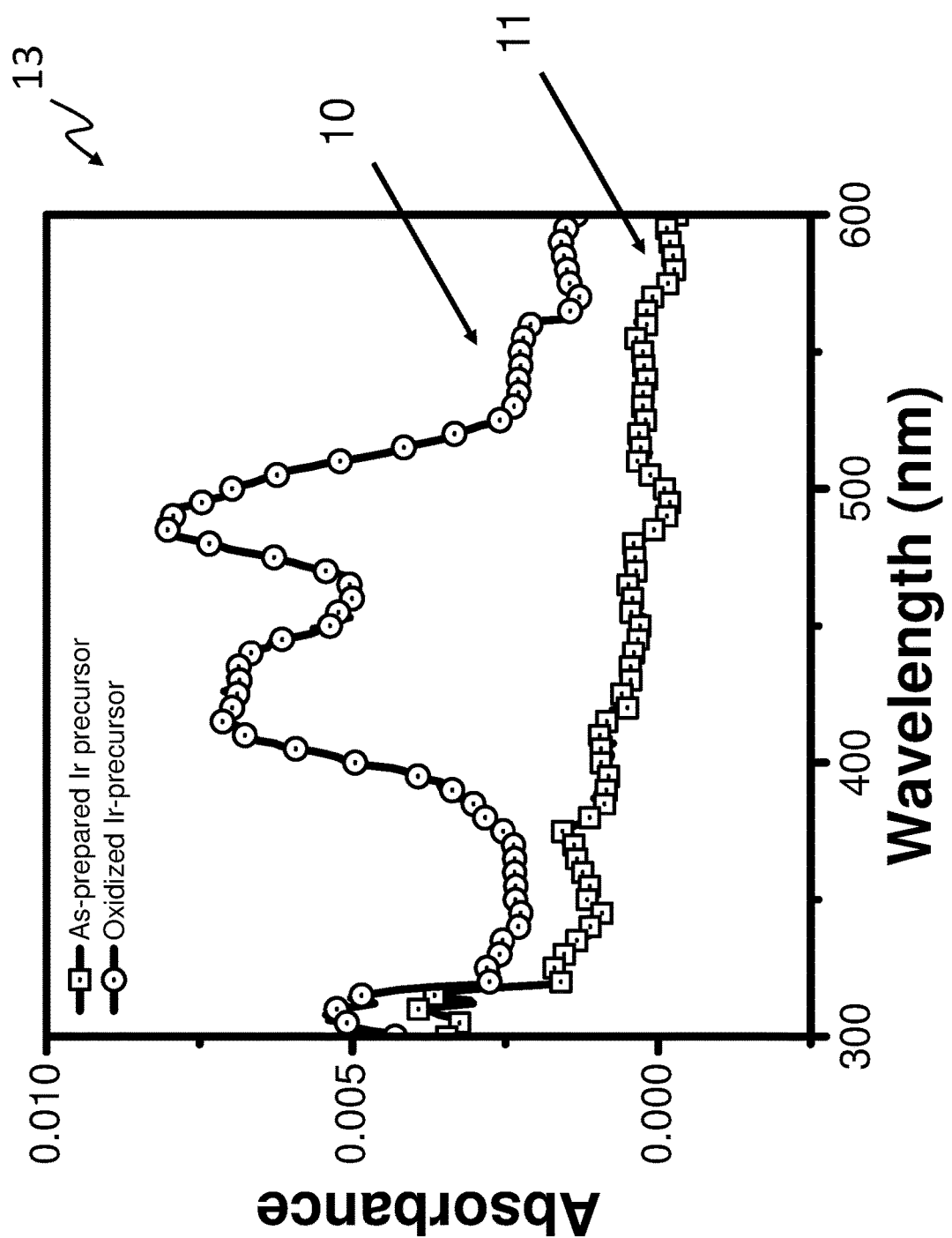
FIG. 8 shows UV-vis spectra of the solution containing Ir ions and of the correspondent oxidized solution according to one embodiment of the invention.

FIG. 8 shows UV-vis spectra 13 of the solution containing Ir ions obtained by dissolving iridium oxides through steps S1 and S2 and of the corresponding oxidized solution by refluxing with H$_2$O$_2$.

The spectrum of the oxidized solution 10 shows the appearance of absorption peaks between 400 and 550 nm. This indicates the formation of Ir$^{4+}$ ions originated by the oxidation of the Ir$^{3+}$ ions present in the solution formed through step S1 and S2, which shows a characteristic spectrum 11 having a flat profile.

Figure 9:
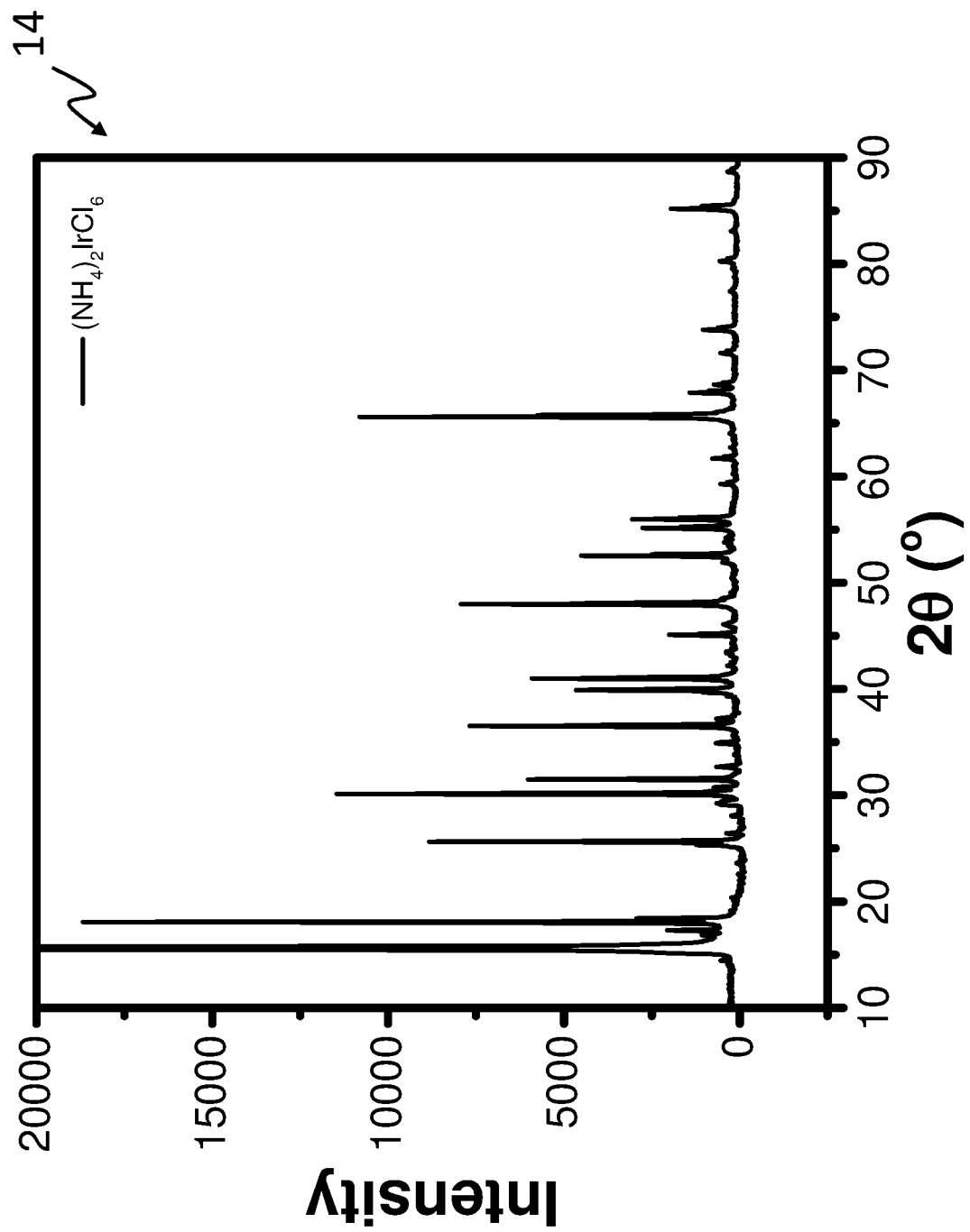
FIG. 9 shows the XRD pattern of the precipitate formed following the addition of $NH_4Cl$ according to one embodiment of the invention.

FIG. 9 shows the XRD pattern 14 of the precipitate formed following the addition of NH$_4$Cl.

The XRD pattern 14 of FIG. 9 exhibits the diffraction peaks corresponding to the finger print of (NH$_4$)$_2$IrCl$_6$, confirming the formation of the iridium salt.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method of recovering iridium from a body comprising Ir$_x$O$_y$ nanoparticles, wherein x is a number between 1 and 2 and y is a number between 1 and 4, wherein said body is a spent catalyst for water electrolysis, wherein said method comprises:
   contacting said body with a reducing agent, wherein said reducing agent is an aqueous solution of hydrazine having a mean weight percent concentration wt % higher than 35%, thereby forming a suspension; and
   dissolving said suspension by exposing said suspension to an acidic solution, wherein said acid solution comprises hydrogen halides having a concentration between 0.5 M to 1 M and one or more halide salts, thereby forming a solution comprising iridium ions.

2. The method of recovering iridium according to claim 1, wherein said Ir$_x$O$_y$ comprises Ir(IV) oxides compounds.

3. The method of recovering iridium according to claim 1, wherein said suspension is a suspension of Ir$_x$O$_y$ compounds comprising Ir(III) oxides particles.

4. The method of recovering iridium according to claim 1, wherein said contacting said body with a reducing agent comprises contacting said body with a reducing agent for a period of time between 5 and 30 minutes at room temperature.

5. The method of recovering iridium according to claim 1, wherein said contacting said body with a reducing agent comprises contacting said body with a reducing agent under sonication.

6. The method of recovering iridium according to claim 1, wherein said dissolving comprises dissolving said suspension by exposing said suspension to a solution comprising hydrogen halides for a period of time between 10 minutes to 4 hours at a temperature between 50° C. and 120° C. at the pressure of 1 Atm.

7. The method according to claim 1, further comprising:
   precipitating said iridium ions as Ir metal particles by exposing said solution containing iridium ions to a reducing agent at a temperature between 60° C. and 100° C. for a period of time between 1 hour and 3 hours.

8. The method according to claim 1, further comprising:
   precipitating said iridium ions as Ir$_x$O$_y$, by contacting said solution containing iridium ions with NaOH at a temperature between 100° C. and 200° C. for a period of time between 10 minutes and 60 minutes at a pressure between 1 and 10 Atm.

9. The method according to claim 1, further comprising:
   precipitating said iridium ions as Ir salts by contacting said solution containing iridium ions with H$_2$O$_2$, and by adding NH$_4$Cl in a concentration 3M eq. to said oxidized solution containing iridium ions.

10. The method of claim 1, wherein the acid solution comprises HCl.

* * * * *